(12) United States Patent
Chao et al.

(10) Patent No.: US 12,275,822 B2
(45) Date of Patent: Apr. 15, 2025

(54) FOAM, COMPOSITE MATERIAL, AND FOAMING COMPOSITION

(71) Applicant: INDUSTRIAL TECHNOLOGY RESEARCH INSTITUTE, Hsinchu (TW)

(72) Inventors: Ying-Chieh Chao, Yongjing Township (TW); Yun-Cheng Chung, Pingtung (TW); Chin-Lang Wu, Tongsiao Township (TW); Shihn-Juh Liou, Hsinchu (TW); Sheng-Lung Chang, Taoyuan (TW); Wen-Chung Liang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 778 days.

(21) Appl. No.: 17/563,861

(22) Filed: Dec. 28, 2021

(65) Prior Publication Data

US 2023/0203250 A1 Jun. 29, 2023

(51) Int. Cl.
*C08G 75/029* (2016.01)
*C08J 5/04* (2006.01)
(Continued)

(52) U.S. Cl.
CPC ............ *C08G 75/029* (2013.01); *C08J 5/042* (2013.01); *C08J 5/043* (2013.01); *C08J 9/0085* (2013.01);
(Continued)

(58) Field of Classification Search
CPC .......... C08G 75/029; C08G 2110/0041; C08J 5/042; C08J 5/043; C08J 9/0085;
(Continued)

(56) References Cited

U.S. PATENT DOCUMENTS 5,272,182 A 12/1993 Burnell
10,526,466 B2 1/2020 Glew et al.
(Continued)

FOREIGN PATENT DOCUMENTS

CN 202315553 U 7/2012
CN 106349679 A 1/2017
(Continued)

OTHER PUBLICATIONS

Taiwanese Office Action and Search Report for corresponding Taiwanese Application No. 111123573, dated Mar. 7, 2023.

*Primary Examiner* — Michael M. Bernshteyn
(74) *Attorney, Agent, or Firm* — Birch, Stewart, Kolasch & Birch, LLP (57) ABSTRACT

A foam and a foaming composition are provided. The foam includes a composite material and a plurality of foam cells, wherein the foam cells are disposed in the composite material. The composite material includes a modified sulfur-containing polymer and a fluorine-containing polymer fiber, wherein a degree of orientation as defined by the ratio $I_{110}/I_{200}$ is from 1.0 to 1.3, wherein $I_{110}$ is the X-ray diffraction peak intensity of (110) planes of the modified sulfur-containing polymer and $I_{200}$ is the X-ray diffraction peak intensity of (200) planes of the modified sulfur-containing polymer.

24 Claims, 5 Drawing Sheets

(51) Int. Cl.
*C08J 9/00* (2006.01)
*C08L 27/18* (2006.01)

(52) U.S. Cl.
CPC ...... *C08L 27/18* (2013.01); *C08G 2110/0041* (2021.01); *C08J 2205/044* (2013.01); *C08J 2327/18* (2013.01); *C08J 2381/02* (2013.01); *C08L 2203/12* (2013.01)

(58) Field of Classification Search
CPC .............. C08J 2205/044; C08J 2381/02; C08J 2327/18; C08L 27/18; C08L 2203/12
USPC .......................................................... 521/50
See application file for complete search history.

(56) References Cited

U.S. PATENT DOCUMENTS

| | | | |
|---|---|---|---|
| 10,526,486 B2* | 1/2020 | Miyamoto | B32B 27/34 |
| 10,793,691 B2 | 10/2020 | Glew et al. | |
| 10,815,336 B2* | 10/2020 | Wu | C08J 9/0061 |
| 11,434,334 B2* | 9/2022 | Cheng | C08J 5/047 |
| 11,607,668 B2* | 3/2023 | Böhringer | B01J 20/28026 |
| 2018/0111349 A1* | 4/2018 | Polidore | B32B 7/04 |

FOREIGN PATENT DOCUMENTS

| | | |
|---|---|---|
| CN | 108422725 A | 8/2018 |
| CN | 208484332 U | 2/2019 |
| CN | 109955423 A | 7/2019 |
| CN | 111587172 A | 8/2020 |
| CN | 112852125 A | 5/2021 |
| JP | 6958546 B2 | 11/2021 |
| KR | 10-2020-0133765 A | 11/2020 |
| KR | 10-2020-0135413 A | 12/2020 |
| TW | 200508299 A | 3/2005 |
| TW | 291231527 A1 | 8/2012 |
| TW | 1717957 B | 2/2021 |

* cited by examiner

FOAM, COMPOSITE MATERIAL, AND FOAMING COMPOSITION

TECHNICAL FIELD

The disclosure relates to a foam, a composite material and a foaming composition.

BACKGROUND

Synthetic resin, which is reinforced with fibers, has been gradually used in fields such as automobile manufacturing, shipmaking, aviation, medical treatment, and construction due to its light weight and high mechanical strength.

Automobiles are the most common vehicles used for transportation. They are also the main source of pollution because of their exhaust and the energy consumption. Therefore, construction of lightweight automobiles has become a significant direction for improvement. With the use of lightweight materials, the weight of an automobile can be lowered, thereby reducing its fuel consumption and exhaust emissions Polyarylene sulfide (PAS) is a material with good mechanical properties and excellent thermal and chemical resistance compared to the metals used in the electronics and automobile industries. Due to the low melt strength and bubble retention of the polyarylene sulfide resin, the obtained foam would have defects (such as surface explosion or formation of surface voids or inner voids)

SUMMARY

According to embodiments of the disclosure, the disclosure provides a foam. The foam of the disclosure consists of a composite material and a plurality of foam cells, and the plurality of foam cells are disposed in the composite material, wherein the composite material includes a modified sulfur-containing polymer, and a fluorine-containing polymer fiber. The degree of orientation as defined by the ratio $I_{110}/I_{200}$ is from 1.0 to 1.3, wherein $I_{110}$ is the X-ray diffraction peak intensity of (110) planes of the modified sulfur-containing polymer and $I_{200}$ is the X-ray diffraction peak intensity of (200) planes of the modified sulfur-containing polymer.

According to some embodiments of the disclosure, the disclosure provides a composite material. The composite material includes a modified sulfur-containing polymer, and a fluorine-containing polymer fiber. The degree of orientation as defined by the ratio $I_{110}/I_{200}$ is from 1.0 to 1.3, wherein $I_{110}$ is the X-ray diffraction peak intensity of (110) planes of the modified sulfur-containing polymer and $I_{200}$ is the X-ray diffraction peak intensity of (200) planes of the modified sulfur-containing polymer. The fluorine-containing polymer fiber is 0.1 wt% to 2 wt%, based on the total weight of the fluorine-containing polymer fiber and the modified sulfur-containing polymer.

According to some embodiments of the disclosure, the disclosure provides a foaming composition, which is used to preparing the foam of the disclosure. The foaming composition includes 96-98.9 parts by weight of a sulfur-containing polymer; 0.5 to 2 parts by weight of a vinyl aromatic-co-acrylate oligomer with an epoxy functional group; 0.5 to 2 parts by weight of a vinyl aromatic-co-maleic anhydride oligomer; and 0.1 to 2 parts by weight of a fluorine-containing polymer, wherein the total weight of the sulfur-containing polymer, the vinyl aromatic-co-acrylate oligomer with an epoxy functional group, the vinyl aromatic-co-maleic anhydride oligomer, and the fluorine-containing polymer is 100 parts by weight.

A detailed description is given in the following embodiments.

DETAILED DESCRIPTION

The foam and the foaming composition of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art.

The embodiments of the disclosure provide a foam, and a foaming composition. The conventional non-modified polyarylene sulfide has low gas permeability and is apt to be thermal cracked in the thermal processing process, resulting in the decrease of melt strength. Therefore, the foam prepared by subjecting the conventional non-modified polyarylene sulfide to a foaming process would have defects (such as surface explosion, or formation of surface voids or inner voids). According to embodiments of the disclosure, the foam of the disclosure consists of a composite material and a plurality of foam cells, wherein the composite material includes a modified sulfur-containing polymer and a fluorine-containing polymer fiber. The modified sulfur-containing polymer is prepared by subjecting a sulfur-containing polymer to a modification with a vinyl aromatic-co-acrylate oligomer with an epoxy functional group, and a vinyl aromatic-co-maleic anhydride oligomer. Therefore, the polar functional group (such as thiol group) of the sulfur-containing polymer can be consumed, and the sheet-shaped crystalline structure ((200) planes) of the sulfur-containing polymer may be altered into the pillar-like shaped crystalline structure ((110) planes). In addition, the fluorine-containing polymer fiber of the composite material of the disclosure has a specific configuration (for example a fiber shape (having an aspect ratio greater than or equal to 50)) and a specific content. As a result, the composite material of the disclosure can assist the blowing agent to be uniformly adsorbed on the fluorine-containing polymer and be dispersed in the composite material.

Therefore, the foam of the disclosure exhibits great physical properties maintenance (such as tensile strength maintenance, bending strength maintenance, and Izod impact strength maintenance), lower average pore diameter of foam cells (such as less than 50 μm), high distribution density of foam cells (such as greater than $5 \times 10^5$ cells/cm$^3$). Furthermore, due to the branched structure of the modified sulfur-containing polymer of the disclosure, the composite material can exhibit low melt flow index (such as less than 100 g/10 minutes) and high melt strength, such that the composite material shows obvious strain hardening during melt stretching, which makes it able to withstand greater pressure during foaming and to avoid foam cell collapse during foaming process.

According to embodiments of the disclosure, the foam of the disclosure consists of a composite material and a plurality of foam cells. According to embodiments of the disclosure, the composite material includes a modified sulfur-containing polymer and fluorine-containing polymer fiber. According to embodiments of the disclosure, the plurality of foam cells is disposed in the composite material. The degree of orientation as defined by the ratio $I_{110}/I_{200}$ is from 1.0 to 1.3 (such as 1.05, 1.1, 1.15, 1.2, or 1.25), wherein $I_{110}$ is the X-ray diffraction peak intensity of (110) planes of the modified sulfur-containing polymer and $I_{200}$ is the X-ray diffraction peak intensity of (200) planes of the modified sulfur-containing polymer. When $I_{110}/I_{200}$ is less than 1, it means that the modified sulfur-containing polymer having sheet-shaped crystalline structure ((200) planes) is greater than the modified sulfur-containing polymer having pillar-like shaped crystalline structure ((110) planes), resulting in a lower gas permeability. As a result, the obtained foam would have defects (such as surface explosion, or formation of surface voids or inner voids).

According to embodiments of the disclosure, the weight percentage of the fluorine-containing polymer fiber can be 0.1 wt % to 2 wt %, such as 0.2 wt %, 0.3 wt %, 0.4 wt %, 0.5 wt %, 0.6 wt %, 0.7 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, or 1.9 wt %, based on the total weight of the fluorine-containing polymer fiber and the modified sulfur-containing polymer. When the weight percentage of the fluorine-containing polymer fiber is too low, a phase separation would occur between the blowing agent and the composite material since the amount of the blowing agent adsorbed by the fluorine-containing polymer fiber is too low. The phase separation will result in increasing foam defects, broadening foam cell size distribution, and the formation of gas bubbles. When the weight percentage of the fluorine-containing polymer fiber is too high, the fluorine-containing polymer fiber is apt to aggregate in the composite material, thereby deteriorating the composite material processability. According to embodiments of the disclosure, the fluorine-containing polymer fiber can be polytetrafluoroethylene (PTFE) fiber, polyvinylidene fluoride (PVDF) fiber, perfluoroalkoxy alkane (PFA) fiber, fluorinated ethylene propylene (FEP) fiber, or a combination thereof. According to embodiments of the disclosure, the fluorine-containing polymer fiber can have a number average molecular weight of about 10,000 g/mol to 800,000 g/mol, such as about 20,000 g/mol, 40,000 g/mol, 100,000 g/mol, 160,000 g/mol, 200,000 g/mol, 400,000 g/mol, 600,000 g/mol, or 700,000 g/mol. According to embodiments of the disclosure, in order to assist the fluorine-containing polymer fiber to closely associate with the modified sulfur-containing polymer, the fluorine-containing polymer fiber can have an average length-to-diameter ratio (L/D ratio) greater than about 5, such as about 5 to 2,000, 10 to 2,000, 20 to 2,000, or 10 to 1,500.

According to embodiments of the disclosure, the modified sulfur-containing polymer can be a reaction product of a sulfur-containing polymer, a vinyl aromatic-co-acrylate oligomer with an epoxy functional group, and a vinyl aromatic-co-maleic anhydride oligomer (such as the product prepared by a cross-linking reaction).

According to embodiments of the disclosure, the sulfur-containing polymer can be polyarylene sulfide (such as polyphenylene sulfide), polyarylsulfone (such as polyphenylene sulfone), poly(arylene sulfone imide), poly(ether sulfones), polyarylene thioether ketone (such as polyphenylene sulfide ketones), or poly(phenylene sulfide sulfone). The sulfur-containing polymer can have a number average molecular weight of about 10,000 g/mol to 1,000,000 g/mol, such as about 15,000 g/mol, 20,000 g/mol, 40,000 g/mol, 100,000 g/mol, 160,000 g/mol, 200,000 g/mol, 400,000 g/mol, 600,000 g/mol, 800,000 g/mol, or 900,000 g/mol. According to embodiments of the disclosure, the sulfur-containing polymer of the disclosure is free of nitrogen atom.

According to embodiments of the disclosure, the vinyl aromatic-co-acrylate oligomer with an epoxy functional group can be a copolymer of a first vinyl aromatic monomer and an acrylate monomer, wherein the acrylate monomer at least includes acrylate monomer with an epoxy functional group. According to embodiments of the disclosure, the number average molecular weight of the vinyl aromatic-co-acrylate oligomer with an epoxy functional group can be about 1,500 g/mol to 65,000 g/mol (such as about 2500 g/mol to 65,000 g/mol, 3,000 g/mol to 65,000 g/mol, 4,000 g/mol to 65,000 g/mol, 5,000 g/mol to 60,000 g/mol, 1,500 to 50,000, 2,000 g/mol to 50,000 g/mol, 3,000 g/mol to 50,000 g/mol, or 5,000 g/mol to 50,000 g/mol); the acid value of the vinyl aromatic-co-acrylate oligomer with an epoxy functional group can be about 65 mgKOH/g to 500 mgKOH/g (such as about 80 mgKOH/g to 500 mgKOH/g, 100 mgKOH/g to 500 mgKOH/g, 150 mgKOH/g to 500 mgKOH/g, 200 mgKOH/g to 500 mgKOH/g, 65 mgKOH/g to 300 mgKOH/g, 65 mgKOH/g to 400 mgKOH/g, or 100 mgKOH/g to 400 mgKOH/g); and, the epoxy equivalent per weight (EEW) of the vinyl aromatic-co-acrylate oligomer with an epoxy functional group can be about 200 g/mole to 2,000 g/mole (such as about 300 g/mole to 2,000 g/mole, 400 g/mole to 2,000 g/mole, 500 g/mole to 2,000 g/mole, 200 g/mole to 1,800 g/mole, or 200 g/mole to 1,600 g/mole). According to embodiments of the disclosure, the vinyl aromatic-co-acrylate oligomer with an epoxy functional group of the disclosure is free of nitrogen atom.

According to embodiments of the disclosure, the acrylate monomer with an epoxy functional group can be glycidyl acrylate, glycidyl methacrylate, 2-(2-oxiranylmethoxy)ethyl methacrylate, 2-(2-oxiranylmethoxy)ethyl acrylate, 3,4-epoxycyclohexylmethyl acrylate, 3,4-epoxycyclohexylmethyl methacrylate, 2-methylglycidyl acrylate, 2-methyl glycidyl methacrylate, or a combination thereof. According to embodiments of the disclosure, the first vinyl aromatic monomer can be styrene, methyl styrene, ethyl styrene, propyl styrene, cyclohexyl styrene, vinyl biphenyl, or a combination thereof.

According to embodiments of the disclosure, the acrylate monomer can further include methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

According to embodiments of the disclosure, the vinyl aromatic-co-acrylate oligomer with an epoxy functional group can be a copolymer of the first vinyl aromatic monomer and the acrylate monomer with an epoxy functional group. In addition, according to embodiments of the disclosure, the vinyl aromatic-co-acrylate oligomer with an epoxy functional group can be a copolymer of the first vinyl aromatic monomer, the first acrylate monomer, and a second acrylate monomer, wherein the first acrylate monomer is an acrylate monomer with an epoxy functional group, and the second acrylate monomer is distinct from the first acrylate monomer. According to embodiments of the disclosure, the second acrylate monomer can be methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

According to embodiments of the disclosure, the vinyl aromatic-co-acrylate oligomer with an epoxy functional group can have repeating units of arranged in a block, an alternating fashion, or a random fashion, wherein $R^1$, $R^2$, $R^4$, $R^6$, or $R^7$ are independently hydrogen or $C_{1-6}$ alkyl group; $R^3$ is hydrogen, $C_{1-6}$ alkyl group, $C_{5-7}$ cycloalkyl group, or phenyl group; and $R^5$ is $C_{1-6}$ alkyl group, or $C_{5-7}$ cycloalkyl group. According to embodiments of the disclosure, $C_{1-6}$ alkyl group can be linear or branched alkyl group. For example, $C_{1-6}$ alkyl group can be methyl, ethyl, propyl, butyl, pentyl, hexyl, or an isomer thereof. According to embodiments of the disclosure, $C_{5-7}$ cycloalkyl group can be cyclopentyl, cyclohexyl, or cycloheptyl.

According to embodiments of the disclosure, the vinyl aromatic-co-acrylate oligomer with an epoxy functional group can have x number of repeating unit, y number of repeating unit, and z number of repeating unit, wherein x, y and z are independently an integer from 1 to 30, such as 2, 3, 4, 5, 6, 7, 8, 9, 10, 11, 12, 13, 14, 15, 16, 17, 18, 19, 20, 21, 22, 23, 24, 25, 26, 27, 28, or 29. According to embodiments of the disclosure, z:(x+y) can be from 2:1 to 20:1. When the ratio of z to x+y (i.e. z/(x+y)) is too low, the melt strength of the modified sulfur-containing polymer is reduced. When the ratio of z to x+y (i.e. z/(x+y)) is too high, the processability of the modified sulfur-containing polymer is reduced.

According to embodiments of the disclosure, the vinyl aromatic-co-maleic anhydride oligomer can be a copolymer of the second vinyl aromatic monomer and a maleic anhydride monomer. According to embodiments of the disclosure, the molar ratio of the second vinyl aromatic monomer and the maleic anhydride monomer is 1:1 to 4:1. According to embodiments of the disclosure, the number average molecular weight of the vinyl aromatic-co-maleic anhydride oligomer can be 2,000 g/mol to 15,000 g/mol (such as about 2,000 g/mol to 15,000 g/mol, 3,000 g/mol to 15,000 g/mol, 5,000 g/mol to 15,000 g/mol, 5,000 g/mol to 13,000 g/mol, or 3,000 g/mol to 12,000 g/mol). The number average molecular weight of the fluorine-containing polymer, sulfur-containing polymer, vinyl aromatic-co-acrylate oligomer with an epoxy functional group, and vinyl aromatic-co-maleic anhydride oligomer can be determined by gel permeation chromatography (GPC) based on a polystyrene calibration curve.

According to embodiments of the disclosure, the acid value of the vinyl aromatic-co-maleic anhydride oligomer can be 200 mgKOH/g to 500 mgKOH/g (such as about 200 mgKOH/g to 450 mgKOH/g, 200 mgKOH/g to 400 mgKOH/g, 250 mgKOH/g to 500 mgKOH/g, 250 mgKOH/g to 450 mgKOH/g, or 250 mgKOH/g to 400 mgKOH/g). According to embodiments of the disclosure, the vinyl aromatic-co-maleic anhydride oligomer of the disclosure is free of nitrogen atom.

According to embodiments of the disclosure, the second vinyl aromatic monomer can be styrene, methyl styrene, ethyl styrene, propylstyrene, cyclohexyl styrene, vinyl biphenyl, or a combination thereof. According to embodiments of the disclosure, the maleic anhydride monomer can be maleic anhydride, 2-methyl-maleic anhydride, 2,3-dimethyl-maleic anhydride, 2-ethyl-maleic anhydride, 2,3-diethyl-maleic anhydride, 2-trifluoromethyl-maleic anhydride, 2,3-bis(trifluoromethyl)-maleic anhydride, 2-methyl-3-trifluoromethyl-maleic anhydride, or a combination thereof.

According to embodiments of the disclosure, the vinyl aromatic-co-maleic anhydride oligomer can have repeating units of repeating unit, wherein the repeating units can arranged in a block, an alternating fashion, or a random fashion, wherein $R^1$, $R^2$, $R^8$, and $R^9$ can be independently hydrogen or $C_{1-6}$ alkyl group; and, $R^3$ can be hydrogen, $C_{1-6}$ alkyl group, $C_{5-7}$ cycloalkyl group, or phenyl group.

According to embodiments of the disclosure, the vinyl aromatic-co-acrylate oligomer with an epoxy functional group can have n number of repeating unit, and m number of repeating unit, wherein n and m are independently an integer from 1 to 30, such as 2, 3, 4, 5, 6, 7, 8, 9, 10, 11, 12, 13, 14, 15, 16, 17, 18, 19, 20, 21, 22, 23, 24, 25, 26, 27, 28, or 29. According to embodiments of the disclosure, n:m can be about 1:1 to 4:1. When the ratio of n to m is too high, the melt strength of the modified sulfur-containing polymer is reduced due to the low amount of anhydride functional group for undergoing cross-linking reaction. When the ratio of n to m is too low, the processability of the modified sulfur-containing polymer is reduced.

According to embodiments of the disclosure, the modified sulfur-containing polymer is prepared by subjecting a sulfur-containing polymer to a modification with a vinyl aromatic-co-acrylate oligomer with an epoxy functional group and a vinyl aromatic-co-maleic anhydride oligomer. The epoxy functional group of the vinyl aromatic-co-acrylate oligomer can be reacted with the terminal functional group of the sulfur-containing polymer, and the anhydride group of the vinyl aromatic-co-maleic anhydride oligomer can be reacted with the terminal functional group of the sulfur-containing polymer.

According to embodiments of the disclosure, the ratio of the total weight of the vinyl aromatic-co-acrylate oligomer with an epoxy functional group and the vinyl aromatic-co-maleic anhydride oligomer to the weight of the sulfur-containing polymer can be about 5:1000 to 3.1:100 (such as 1:100 to 3.1:100, 1.2:100 to 3.1:100, 1.5:100 to 3:100, 1:100 to 2.9:100, or 1:100 to 2.8:100). When the amount of the oligomer is too low, the melt flow index and gas permeability of the modified sulfur-containing polymer would not be improved, and it is disadvantageous for the subsequent foaming process. When the amount of the oligomer is too high, the composite material would not melt due to too high cross-linking degree of the modified sulfur-containing polymer, resulting in that the composite material could not be used to form a foam According to embodiments of the disclosure, the weight ratio of the vinyl aromatic-co-acrylate oligomer with an epoxy functional group to the vinyl aromatic-co-maleic anhydride oligomer can be 1:5 to 5:1, such as 1:5 to 4:1, 1:4 to 5:1, 1:4 to 4:1, or 1:3 to 3:1. When the weight ratio of the vinyl aromatic-co-acrylate oligomer with an epoxy functional group to the vinyl aromatic-co-maleic anhydride oligomer is too high or too low, the melt flow index and gas permeability of the modified sulfur-containing polymer would not be improved. In addition, when only single oligomer (i.e. vinyl aromatic-co-acrylate oligomer with an epoxy functional group or the vinyl aromatic-co-maleic anhydride oligomer) is used to modify the sulfur-containing polymer, the single oligomer exhibit poor dispersibility among the sulfur containing polymer due to the aggregation of the molecular chain entanglement, resulting in that the gas permeability cannot be improved effectively.

According to embodiments of the disclosure, the composite material of the disclosure can further include a reinforcement fiber, wherein the reinforcement fiber can be glass fiber, carbon fiber, or a combination thereof. According to embodiments of the disclosure, the composite material can consist of the modified sulfur-containing polymer, the fluorine-containing polymer fiber, and the reinforcement fiber. According to embodiments of the disclosure, the ratio of the weight of the reinforcement fiber to the total weight of the modified sulfur-containing polymer and the fluorine-containing polymer fiber can be about 0.5:9.5 to 4:6, such as about 1:9 to 4:6, 1:9 to 3:7, 1:9 to 2:8, or 1:5 to 4:6. When the amount of the reinforcement fiber is too low, the effect of thermal stability, which is reinforced by physical strength, is not obvious, and the composite material exhibits a relatively high dimensional shrinkage. When the amount of the reinforcement fiber is too high, the surface flatness and processability of materials would be affected since the fibers easily protrude out of the surface of the composite material, resulting in that the application of the product fabricated from the composite material is restricted. According to embodiments of the disclosure, the reinforcement fiber of the composite material has an average length between about 0.01 mm to 1 mm, such as 0.02 mm, 0.05 mm, 0.1 mm, 0.2 mm, 0.5 mm, or 0.8 mm.

According to embodiments of the disclosure, the average pore diameter of foam cells of the foam of the disclosure can be 10 μm to 50 μm, such as 10 μm to 45 μm. In addition, the maximum diameter of the foam cell of the foam of the disclosure can be less than 70 μm, such as less than 60 μm, or less than 55 μm. According to embodiments of the disclosure, the distribution density of foam cells of the foam of the disclosure can be greater than $5\times10^6$ cells/cm$^3$, such as $5\times10^6$ cells/cm$^3$ to $1\times10^8$ cells/cm$^3$, $6\times10^6$ cells/cm$^3$ to $1\times10^8$ cells/cm$^3$, $7\times10^6$ cells/cm$^3$ to $1\times10^8$ cells/cm$^3$, or $8\times10^6$ cells/cm$^3$ to $1\times10^8$ cells/cm$^3$.

According to embodiments of the disclosure, the disclosure provides a foaming composition for preparing a composite material, wherein the foam of the disclosure can be obtained by subjecting the composite material to a foaming process. The foaming composition can include 96-98.9 parts by weight of a sulfur-containing polymer, 0.5 to 2 parts by weight of a vinyl aromatic-co-acrylate oligomer with an epoxy functional group, 0.5 to 2 parts by weight of a vinyl aromatic-co-maleic anhydride oligomer, and 0.1 to 2 parts by weight of a fluorine-containing polymer. According to embodiments of the disclosure, the total weight of the sulfur-containing polymer, the vinyl aromatic-co-acrylate oligomer with an epoxy functional group, the vinyl aromatic-co-maleic anhydride oligomer, and the fluorine-containing polymer is 100 parts by weight. According to some embodiments of the disclosure, the foaming composition can further include 5 to 70 parts by weight (such as 5 to 65 parts by weight, 10 to 70 parts by weight, 15 to 70 parts by weight, or 10 to 60 parts by weight) of a reinforcement fiber, wherein the total weight of the sulfur-containing polymer, the vinyl aromatic-co-acrylate oligomer with an epoxy functional group, the vinyl aromatic-co-maleic anhydride oligomer, and the fluorine-containing polymer is 100 parts by weight. In other words, the weight ratio of the reinforcement fiber to the sum of the sulfur-containing polymer, the vinyl aromatic-co-acrylate oligomer with an epoxy functional group, the vinyl aromatic-co-maleic anhydride oligomer, and the fluorine-containing polymer can be 5:100 to 70:100. According to some embodiments of the disclosure, the foaming composition can optionally further includes an additive, such as process oil, initiator, stabilizer, melt strength enhancer, antioxidant, antistick agent, antistatic agent, or a combination thereof. The amount of the additive is not limited and can be optionally modified by a person of ordinary skill in the field. According to embodiments of the disclosure, the amount of the additive can be 0.1 to 10 parts by weight. The fluorine-containing polymer can be polytetrafluoroethylene (PTFE), polyvinylidene fluoride (PVDF), perfluoroalkoxy alkane (PFA), fluorinated ethylene propylene (FEP), or a combination thereof.

According to embodiments of the disclosure, the method for preparing the composite material can include following steps. First, an aforementioned foaming composition is provided. Next, the foaming composition is added into a twin-screw extruder (with an aspect ratio of about 40 to 60) to be subjected to a melt blending process, wherein the screw speed is from 60 rpm to 300 rpm, and the barrel temperature is from 180° C. to 220° C. In this stage, the sulfur-containing polymer reacts with the vinyl aromatic-co-acrylate oligomer with an epoxy functional group and the vinyl aromatic-co-maleic anhydride oligomer to form the modified sulfur-containing polymer. Next, after performing the melt blending process for 0.1 minutes-5 minutes, the barrel temperature of the twin-screw extruder is increased with a predetermined gradient to about 250° C.-265° C. and then subjected to the melt blending process for 0.1 minutes-5 minutes. In this stage, due to the increase of temperature and the shear force, the fluorine-containing polymer is gradually converted from a granular-shaped to a fiber-shaped, and the obtained fluorine-containing polymer fiber further physically entangles with the modified sulfur-containing polymer. Next, a strand extrusion is performed and the result is subjected to a pelletization, obtaining a composite material masterbatch. According to embodiments of the disclosure, the method for preparing the composite material can further include adding reinforcement fiber into the twin-screw extruder.

According to embodiments of the disclosure, the method for preparing the foam of the disclosure from the composite material can include following steps. First, the composite material masterbatch is dried at a temperature between 80° C. and 100° C. for 8 hours-12 hours. Next, the dried composite material masterbatch is subjected to a microcellular foaming process to obtain a foam. The foaming process is performed by a supercritical fluid within the microcellular foam injection molding machine in the condition that the process temperature is between 200° C. and 300° C., the gas pressure is between 1000 psi and 3000 psi, and the volume ratio of nitrogen gas to carbon dioxide is from 10:1 to 6:4.

Below, exemplary embodiments will be described in detail. The inventive concept may be embodied in various forms without being limited to the exemplary embodiments set forth herein. Descriptions of well-known parts are omitted for clarity.

Table 1 lists the material involved in the examples of the disclosure.

TABLE 1

| | |
|---|---|
| polyphenylene sulfide (PPS) | trade number: FORTRON 0205<br>supplier: Celanese<br>melting point: 280° C.<br>Mv: ~90,000 g/mole |
| Oligomer (1) | trade number: JONCRYL ® ADR-4370s<br>supplier: BASF<br>number average molecular weight: ~45000 g/mole<br>acid value: 155 mgKOH/g<br>epoxide equivalent: 1530 g/mole<br>The ratio of the amount of acrylate repeating unit with a glycidyl group to the total amount of the styrene repeating unit and the acrylate repeating unit (without a glycidyl group) is about 4:1 |
| Oligomer (2) | trade number: SMA ® 1000<br>supplier: CRAY VALLEY TECHNOLOGY USA<br>number average molecular weight: 2000 g/mole<br>acid value: 480 mgKOH/g<br>The ratio of the amount of styrene repeating unit and the amount of maleic anhydride repeating unit is about 1:1 |
| polytetrafluoroethylene (PTFE) | trade number: 430935<br>supplier: Aldrich<br>melting point: 321° C.<br>particle size: about 40 μm |
| glass fiber | trade number: Taiwanglass anti-hydrolysis glass Chopped Strand TGFS 173X<br>single fiber diameter: 10~13 μm (±1.4 μm) |
| carbon fiber | trade number: T300<br>supplier: Toray<br>Filament (count/fiber): 3,000<br>single fiber diameter: 7 μm |

EXAMPLES

Preparation of Composite Material Masterbatch

Example 1

96 parts by weight of polyphenylene sulfide, 0.5 parts by weight of Oligomer (1), 1.5 parts by weight of Oligomer (2), and 2 parts by weight polytetrafluoroethylene (PTFE) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (1) and Oligomer (2). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, a strand extrusion was performed and the result was subjected to a pelletization by a pelletizer (GZML-110L-150) at a temperature of 50-100° C. at a screw speed of 20 rpm, obtaining Composite material masterbatch (1).

Example 2

Example 2 was performed in the same manner as in Example 1 except that the weight of Oligomer (1) was increased from 0.5 parts by weight to 1.5 parts by weight, and the weight of Oligomer (2) was reduced from 1.5 parts by weight to 0.5 parts by weight, obtaining Composite material masterbatch (2).

Comparative Example 1

98 parts by weight of polyphenylene sulfide and 2 parts by weight of Oligomer (2) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (2). Next, the temperature of the twin-screw extruder was increased from 220° C. to 280° C. with a predetermined gradient. Next, a strand extrusion was performed and the result was subjected to a pelletization by a pelletizer (GZML-110L-150) at a temperature of 50-100° C. at a screw speed of 20 rpm, obtaining Masterbatch (1).

Comparative Example 2

99.5 parts by weight of polyphenylene sulfide, and 0.5 parts by weight of Oligomer (1) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (1). Next, the temperature of the twin-screw extruder was increased from 220° C. to 280° C. with a predetermined gradient. Next, a strand extrusion was performed and the result was subjected to a pelletization by a pelletizer (GZML-110L-150) at a temperature of 50-100° C. at a screw speed of 20 rpm, obtaining Masterbatch (2).

Comparative Example 3

98 parts by weight of polyphenylene sulfide, and 2 parts by weight of Oligomer (1) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (1). Next, the temperature of the twin-screw extruder was increased from 220° C. to 280° C. with a predetermined gradient. Next, a strand extrusion was performed and the result was subjected to a pelletization by a pelletizer (GZML-110L-150) at a temperature of 50-100° C. at a screw speed of 20 rpm, obtaining Masterbatch (3).

Comparative Example 4

97.5 parts by weight of polyphenylene sulfide, 0.5 parts by weight of Oligomer (1), and 2 parts by weight polytetrafluoroethylene (PTFE) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (1). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, a strand extrusion was performed and the result was subjected to a pelletization by a pelletizer (GZML-110L-150) at a temperature of 50-100° C. at a screw speed of 20 rpm, obtaining Composite material masterbatch (3).

Comparative Example 5

97.5 parts by weight of polyphenylene sulfide, 0.5 parts by weight of Oligomer (2) and 2 parts by weight polytetrafluoroethylene (PTFE) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (2). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, a strand extrusion was performed and the result was subjected to a pelletization by a pelletizer (GZML-110L-150) at a temperature of 50-100° C. at a screw speed of 20 rpm, obtaining Composite material masterbatch (4).

Comparative Example 6

Comparative Example 6 was performed in the same manner as in Comparative Example 4 except that the weight of polyphenylene sulfide was reduced from 97.5 parts by weight to 96 parts by weight, and the weight of Oligomer (1) was increased from 0.5 parts by weight to 2 parts by weight, obtaining Composite material masterbatch (5).

Comparative Example 7

Comparative Example 7 was performed in the same manner as in Comparative Example 5 except that the weight of polyphenylene sulfide was reduced from 97.5 parts by weight to 96 parts by weight, and the weight of Oligomer (2) was increased from 0.5 parts by weight to 2 parts by weight, obtaining Composite material masterbatch (6).

Comparative Example 8

94 parts by weight of polyphenylene sulfide, 2 parts by weight of Oligomer (1), 2 parts by weight of Oligomer (2), and 2 parts by weight polytetrafluoroethylene (PTFE) were added into a twin-screw extruder (available under the trade designation of ZSK-25, with an L/D ratio of 40) to perform a melt blending process, wherein the screw speed was set at 200 rpm, and the barrel temperature was set as 220° C., thereby reacting polyphenylene sulfide with Oligomer (1) and Oligomer (2). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, the result was subjected to a strand extrusion. The result, however, was not able to be pelletized due to the high rigidity.

Next, the melt flow index (MI), and the gas permeability of polyphenylene sulfide of Composite material masterbatches (1)-(6) and Masterbatches (1)-(3) were measured, and the results are shown in Table 2. The melt flow index was determined by the method according to ASTM-D-1238. Furthermore, the method for measuring the gas permeability included following steps. First, the material was formed into a circular sample (with a diameter of about 10 cm, and a thickness of about 50 μm). Next, the gas permeability of the circular sample was determined using the method according to ASTM-D-1434.

TABLE 2

| | polyphenylene sulfide (parts by weight) | polytetrafluoro-ethylene (PTFE) (parts by weight) | Oligomer (1) | Oligomer (2) | melt flow index (g/10 minutes) | gas permeability (μm · ml/ m² · day · atm) |
|---|---|---|---|---|---|---|
| Composite material masterbatch (1) (Example 1) | 96 | 2 | 0.5 | 1.5 | 84.3 | 8.41 |
| Composite material masterbatch (2) (Example 2) | 96 | 2 | 1.5 | 0.5 | 71.6 | 5.02 |
| Polyphenylene sulfide | 100 | — | — | — | 160 | 3.59 |
| Masterbatch (1) (Comparative Example 1) | 98 | — | — | 2 | 102.5 | 3.41 |
| Masterbatch (2) (Comparative Example 2) | 99.5 | — | 0.5 | — | 127.2 | 3.94 |
| Masterbatch (3) (Comparative Example 3) | 98 | — | 2 | — | 89.6 | 3.46 |
| Composite material masterbatch (3) (Comparative Example 4) | 97.5 | 2 | 0.5 | — | 105.7 | 4.10 |
| Composite material masterbatch (4) (Comparative Example 5) | 97.5 | 2 | — | 0.5 | 92.8 | 3.78 |
| Composite material masterbatch (5) (Comparative Example 6) | 96 | 2 | 2 | 0 | 51.5 | 4.72 |
| Composite material masterbatch (6) (Comparative Example 7) | 96 | 2 | 0 | 2 | 93.1 | 5.92 |

As shown in Table 2, the composite material of the disclosure (prepared in a specific ratio of polyphenylene sulfide, Oligomer (1), Oligomer (2), and polytetrafluoroethylene (PTFE)) (i.e. Composite material masterbatches of Examples 1 and 2) exhibited relatively low melt flow index, resulting in high processability. In addition, in comparison with polyphenylene sulfide or the composite material prepared from single oligomer, the composite material of the disclosure (i.e. Composite material masterbatches of Examples 1 and 2) exhibits relatively improved gas permeability, as shown in Table 2.

In addition, when only single oligomer (i.e. vinyl aromatic-co-acrylate oligomer with an epoxy functional group or the vinyl aromatic-co-maleic anhydride oligomer) is used to modify the sulfur-containing polymer, the single oligomer exhibits poor dispersibility among the sulfur containing polymer due to the aggregation of the molecular chain entanglement, resulting in that the gas permeability cannot be improved effectively (as shown in Table 2). In contrast, in the disclosure, the polyphenylene sulfide is modified by the vinyl aromatic-co-acrylate oligomer with an epoxy functional group and the vinyl aromatic-co-maleic anhydride oligomer simultaneously. As a result, the amount of the polar functional groups of the modified polyphenylene sulfide can be consumed, thereby further enhancing the gas permeability of the composite material.

Next, Composite material masterbatches (1)-(6) were dissolved in N-methylpyrrolidone (NMP) individually, and the results were subjected to a filtration to remove fibrous polytetrafluoroethylene (PTFE). Next, the filtrate was subjected to a recrystallization. After concentrating and drying, Modified polyphenylene sulfide (1)-(6) were isolated individually.

Next, through performing an X-ray photoelectron spectroscopy (XPS) analysis on polyphenylene sulfide, Modified polyphenylene sulfide (1)-(6) and Masterbatches (1)-(3), the content of the constituent elements (such as nitrogen) were analyzed, and the results are shown in Table 3. The amount ratio of sulfur in various sulfur-containing bonds (such as S—C, or S—H) of polyphenylene sulfide, Modified polyphenylene sulfide (1)-(6), and Masterbatches (1)-(3) were determined by X-ray photoelectron spectroscopy (XPS) according to ISO 16243, the results are shown in Table 3. Next, the diffraction intensity of the (110) planes (i.e. diffraction peak at a diffraction angle 2θ of 18.8) and the diffraction intensity of the (200) planes (i.e. diffraction peak at a diffraction angle 2θ of 20.4) of Modified polyphenylene sulfide, Modified polyphenylene sulfide (1)-(6), and Masterbatches (1)-(3) were determined by Bruker D8 Discover X-ray diffraction (XRD) system and the results are shown in Table 3.

TABLE 3

| | polyphenylene sulfide (parts by weight) | polytetrafluoroethylene (PTFE) (parts by weight) | oligomer (1) | oligomer (2) | N (atom %) | S (atom %) (S—C bond) | S (atom %) (S—H bond) | $I_{110}/I_{200}$ |
|---|---|---|---|---|---|---|---|---|
| Modified polyphenylene sulfide (1) (Example 1) | 96 | 2 | 0.5 | 1.5 | N.D. | 100 | N.D. | 1.1 |
| Modified polyphenylene sulfide (2) (Example 2) | 96 | 2 | 1.5 | 0.5 | N.D. | 100 | N.D. | 1.2 |
| polyphenylene sulfide | 100 | — | — | — | N.D. | 85.4 | 14.6 | 0.6 |
| Masterbatch (1) (Comparative Example 1) | 98 | — | — | 2 | N.D. | 100 | N.D. | 0.7 |
| Masterbatch (2) (Comparative Example 2) | 99.5 | — | 0.5 | — | N.D. | 100 | N.D. | 0.6 |
| Masterbatch (3) (Comparative Example 3) | 98 | — | 2 | — | N.D. | 100 | N.D. | 0.7 |
| Modified polyphenylene sulfide (3) (Comparative Example 4) | 97.5 | 2 | 0.5 | — | N.D. | 100 | N.D. | 0.6 |
| Modified polyphenylene sulfide (4) (Comparative Example 5) | 97.5 | 2 | — | 0.5 | N.D. | 100 | N.D. | 0.8 |
| Modified polyphenylene sulfide (5) (Comparative Example 6) | 96 | 2 | 2 | 0 | N.D. | 100 | N.D. | 0.6 |

TABLE 3-continued

| | polyphenylene sulfide (parts by weight) | polytetrafluoroethylene (PTFE) (parts by weight) | oligomer (1) | oligomer (2) | N (atom %) | S (atom %) (S—C bond) | S (atom %) (S—H bond) | $I_{110}/I_{200}$ |
|---|---|---|---|---|---|---|---|---|
| Modified polyphenylene sulfide (6) (Comparative Example 7) | 96 | 2 | 0 | 2 | N.D. | 100 | N.D. | 0.7 |

Since the used polyphenylene sulfide, Oligomer (1), and Oligomer (2) are free of nitrogen atom, the composite material of the disclosure (i.e. Composite material masterbatches of Examples 1 and 2) is also free of nitrogen atom, as shown in Table 3. In addition, since the composite material of the disclosure is prepared in a specific ratio of polyphenylene sulfide, Oligomer (1), Oligomer (2), and polytetrafluoroethylene (PTFE), the $I_{110}/I_{200}$ of the composite material of the disclosure can be greater than 1. It means that the sheet-shaped crystalline structure ((200) planes) of the sulfur-containing polymer is altered into the pillar-shaped crystalline structure ((110) planes) of the sulfur-containing polymer after the cross-linking reaction. As a result, when subjecting the composite material of the disclosure to a foaming process, the introduced blowing agent would form relatively small airbags which are attached to the modified polyphenylene sulfide due to the branched structure of the modified polyphenylene sulfide. Therefore, the solubility and gas diffusion rate of supercritical inert gas can be improved, thereby enhancing the foamability.

Example 3

66 parts by weight of polyphenylene sulfide, 30 parts by weight glass fiber, 0.5 parts by weight of Oligomer (1), 1.5 parts by weight of Oligomer (2), and 2 parts by weight polytetrafluoroethylene (PTFE) were added into a twin-screw extruder (available under the trade designation of ZSK-25, with an LID ratio of 40) to perform a melt blending process, wherein the screw speed was set at 200 rpm, and the barrel temperature was set as 220° C., thereby reacting polyphenylene sulfide with Oligomer (1) and Oligomer (2). Next, the temperature of the twin-screw extruder was increased from 220° C. to 280° C. with a predetermined gradient. After performing the melt blending process for 1.5 minutes, the granular polytetrafluoroethylene (PTFE) was softened and then stretched to form a fiber-shaped polytetrafluoroethylene (PTFE). Next, a strand extrusion was performed and the result was subjected to a pelletization by a pelletizer (GZML-110L-150) at a temperature of 50-100° C. at a screw speed of 20 rpm, obtaining Composite material masterbatch (7).

Example 4

Example 4 was performed in the same manner as in Example 3 except that the weight of polyphenylene sulfide was reduced from 66 parts by weight to 56 parts by weight, the glass fiber was replaced with carbon fiber, and the weight of the carbon fiber was 40 parts by weight, obtaining Composite material masterbatch (8).

Comparative Example 8

70 parts by weight of polyphenylene sulfide, and 30 parts by weight glass fiber were added into a twin-screw extruder (available under the trade designation of ZSK-25, with an L/D ratio of 40) to perform a melt blending process, wherein screw speed was set at 200 rpm, and the barrel temperature was set as 220° C. Next, the temperature of the twin-screw extruder was increased from 220° C. to 280° C. with a predetermined gradient. Next, a strand extrusion was performed and the result was subjected to a pelletization by a pelletizer (GZML-110L-150) at a temperature of 50-100° C. at a screw speed of 20 rpm, obtaining Masterbatch (4).

Preparation of Foam

Composite material masterbatches (1) and (2) of Examples 1 and 2, polyphenylene sulfide, Masterbatches (1)-(3) of Comparative Examples 1-3, and Composite material masterbatches (3)-(6) of Comparative Examples 4-7 were dried at 100° C. for 12 hours. Next, the dried Composite material masterbatches (1) and (2), polyphenylene sulfide, Masterbatches (1)-(3), and Composite material masterbatches (3)-(6) were subjected to a microcellular foaming process (with a weight reduction percentage of 20% after foaming) individually, obtaining Foam (1)-(10). The foaming process was performed by a supercritical fluid within a microcellular foam injection molding machine (J450EL-MuCell, commercially available from Japan Steel Works LTD.) in the condition that the process temperature was 300° C., the gas pressure was 2000 psi, and the volume ratio of nitrogen gas to carbon dioxide was 7:3.

Next, the tensile strength maintenance, the bending strength maintenance, and the Izod impact strength maintenance of Foam (1)-(10) were measured, and the results are shown in Table 4. Furthermore, the average pore diameter of foam cells, and the distribution density of foam cells of Foam (1)-(10) were determined according to ASTM-D-3576-77, and the results are shown in Table 4. Herein, the tensile strength maintenance of the disclosure is determined by the following equation:

$$\text{tensile strength maintenance} = \frac{TS_1}{TS_0} \times 100\%,$$

wherein $TS_1$ refers to the tensile strength of the material after foaming, and $TS_0$ refers to the tensile strength of the material before foaming. The tensile strength is determined by the method according to ASTM-D-638. The bending strength maintenance of the disclosure is determined by the following equation:

$$\text{bending strength maintenance} = \frac{BS_1}{BS_0} \times 100\%,$$

wherein $BS_1$ refers to the bending strength of the material after foaming, and $BS_0$ refers to the bending strength of the material before foaming. The bending strength is determined by the method according to ASTM-D-790. The Izod impact strength maintenance of the disclosure is determined by the following equation:

$$\text{Izod impact strength maintenance} = -\frac{IS_1}{IS_0} \times 100\%,$$

wherein $IS_1$ refers to the Izod impact strength of the material after foaming, and $IS_0$ refers to the Izod impact strength of the material before foaming. The Izod impact strength is determined by the method according to ASTM-D-256.

FIGS. 1-8 are scanning electron microscope (SEM) photographs of Foams (1)-(8) respectively.

3-8). Furthermore, due to the broad foam cell size distribution (i.e. large size difference among foam cells), high average pore diameter of foam cells and the low distribution density of foam cells, Form (3)-(8) exhibits inferior characteristics (for example, the Izod impact strength maintenance is less than 85%), as shown in FIGS. 3-8.

Composite material masterbatches (7) and (8) of Examples 3 and 4 and Masterbatch (4) of Comparative Example 8 were dried at 100° C. for 12 hours. Next, the dried Composite material masterbatches (7) and (8), and Masterbatch (4) were subjected to a microcellular foaming process (with a weight reduction percentage of 20% after foaming) individually, obtaining Foam (11)-(13). The foaming process was performed by a supercritical fluid within a microcellular foam injection molding machine (J450EL-

TABLE 4

| | polyphenylene sulfide (parts by weight) | polytetrafluoroethylene (PTFE) (parts by weight) | oligomer (1) (parts by weight) | oligomer (2) (parts by weight) | average pore diameter of foam cells (μm) | distribution density of foam cells (cells/cm³) | tensile strength maintenance (%) | bending strength maintenance (%) | Izod impact strength maintenance (%) |
|---|---|---|---|---|---|---|---|---|---|
| Foam (1) (Example 1) | 96 | 2 | 0.5 | 1.5 | 32.0 | $1.71 \times 10^7$ | 78.2 | 79.2 | 87.4 |
| Foam (2) (Example 2) | 96 | 2 | 1.5 | 0.5 | 39.8 | $8.15 \times 10^6$ | 65.9 | 79.6 | 85.3 |
| Foam (3) (polyphenylene sulfide) | 100 | — | — | — | 124.2 | $1.71 \times 10^4$ | 63.0 | 85.5 | 51.5 |
| Foam (4) (Comparative Example 1) | 98 | — | — | 2 | 78.2 | $1.31 \times 10^6$ | 68.1 | 72.2 | 66.6 |
| Foam (5) (Comparative Example 2) | 99.5 | — | 0.5 | — | 101.4 | $5.2 \times 0^5$ | 59.2 | 70.1 | 61.3 |
| Foam (6) (Comparative Example 3) | 98 | — | 2 | — | 72.7 | $1.42 \times 10^6$ | 66.7 | 73.3 | 70.2 |
| Foam (7) (Comparative Example 4) | 97.5 | 2 | 0.5 | — | 95.9 | $6.62 \times 10^5$ | 72.3 | 70.3 | 59.6 |
| Foam (8) (Comparative Example 5) | 97.5 | 2 | — | 0.5 | 63.7 | $2.21 \times 10^6$ | 60.3 | 74.6 | 80.6 |
| Foam (9) (Comparative Example 6) | 96 | 2 | 2 | — | 56.4 | $2.83 \times 10^6$ | 64.5 | 71.2 | 66.7 |
| Foam (10) (Comparative Example 7) | 96 | 2 | — | 2 | 75.0 | $8.67 \times 10^5$ | 74.2 | 85.4 | 75.2 |

Figure 1:
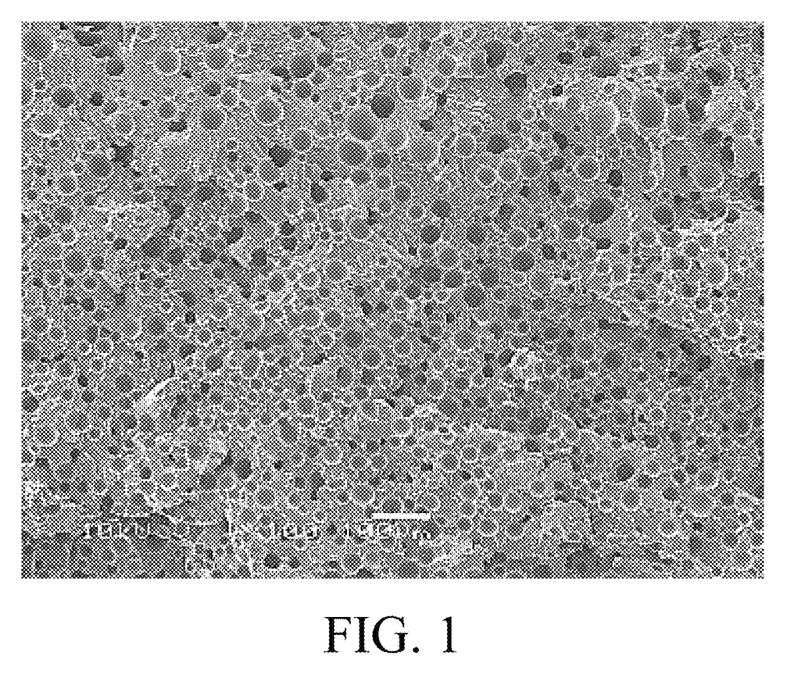
FIGS. 1-10 are scanning electron microscope (SEM) photographs of Foams (1)-(8) and Foams (11) and (12) according to embodiments of the disclosure.
Figure 2:
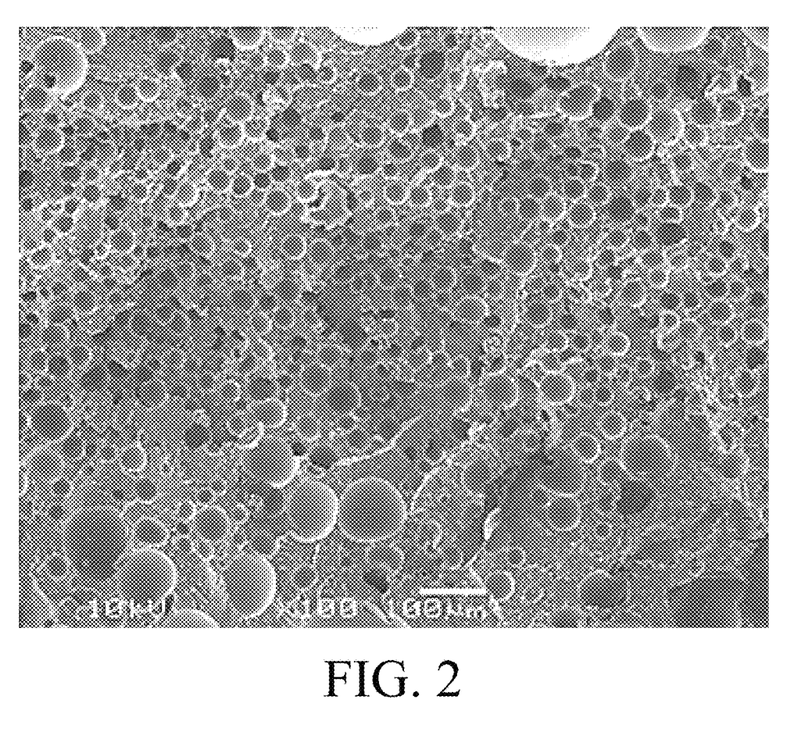
Figure 3:
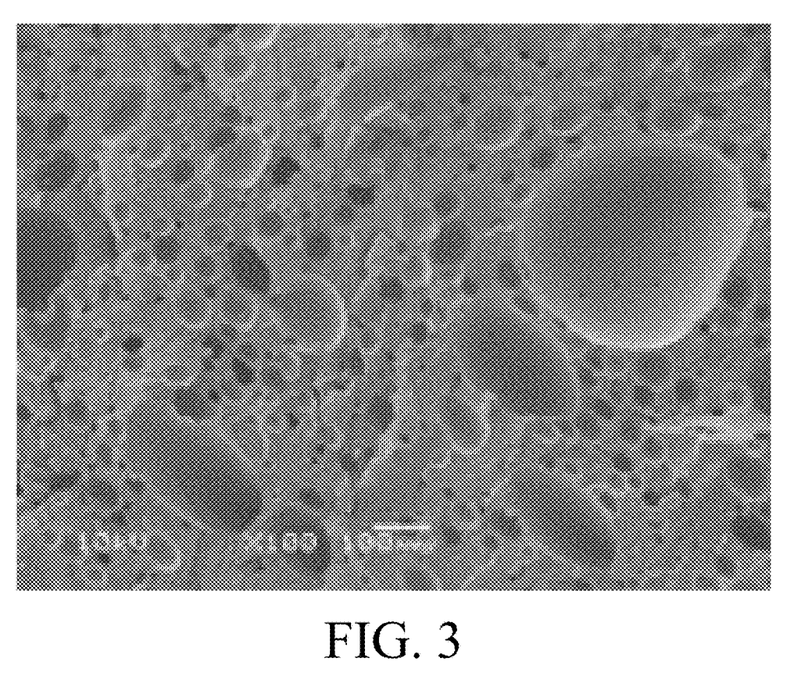
Figure 4:
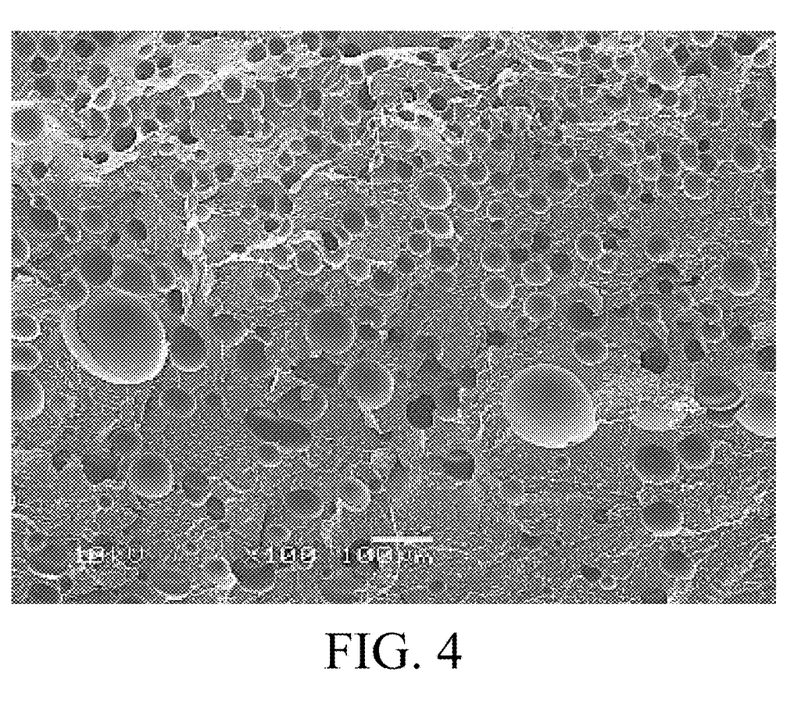
Figure 5:
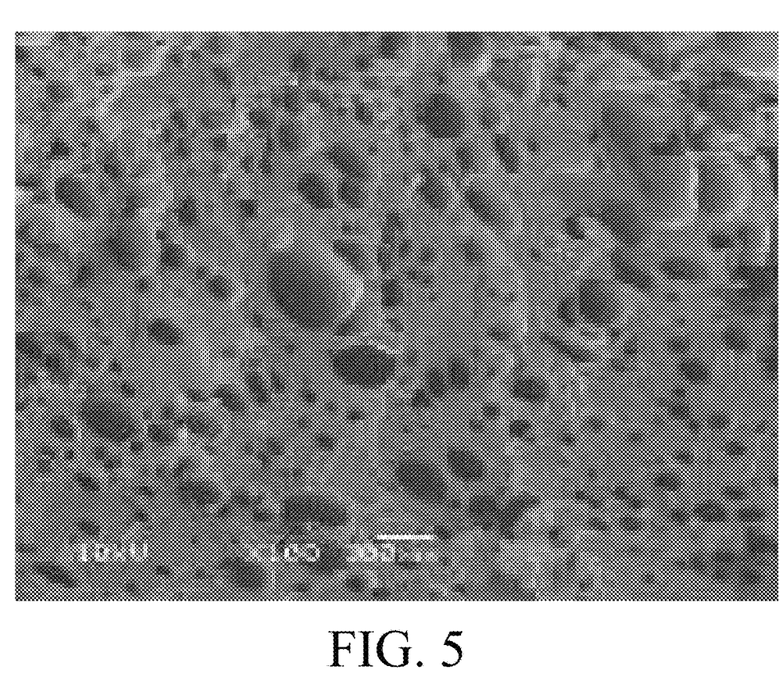
Figure 6:
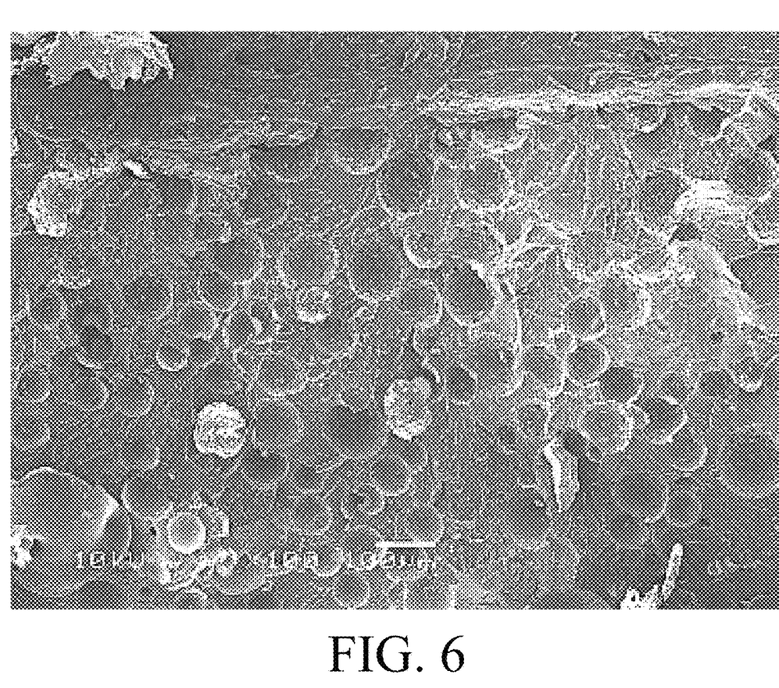
Figure 7:
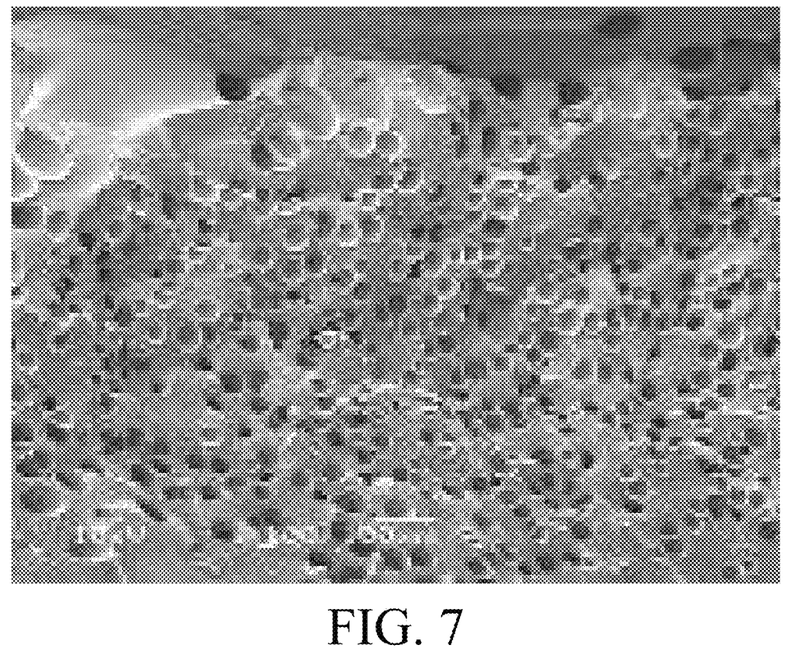
Figure 8:
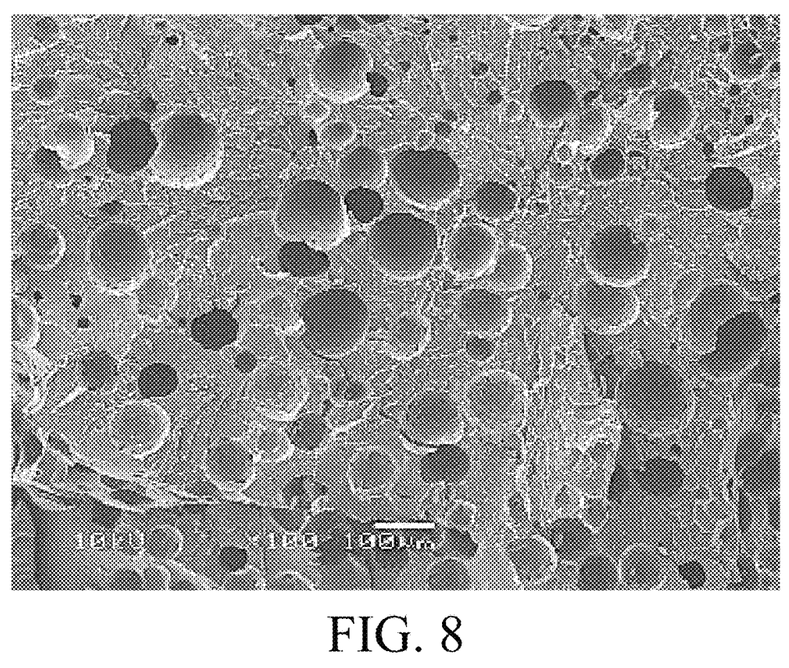

As shown in Table 4, the foam prepared from the composite material of the disclosure prepared in a specific ratio of polyphenylene sulfide, Oligomer (1), Oligomer (2), and polytetrafluoroethylene (PTFE) (i.e. Composite material masterbatches (1) and (2) of Examples 1 and 2) exhibits low average pore diameter of foam cells, high distribution density of foam cells (greater than $5 \times 10^6$ cells/cm³) and uniform pore diameter of foam cells (less than 50 μm) on the premise that the tensile strength maintenance, the bending strength maintenance, and the Izod impact strength maintenance are not reduced, as shown in FIG. 1 and FIG. 2. Due to the low $I_{110}/I_{200}$ (less than 1) of polyphenylene sulfide and Composite material masterbatches or Masterbatches of Comparative Examples 1-7, surface bubbles and inner bubbles in Form (3)-(8) could be observed clearly (as shown in FIGS.

MuCell, commercially available from Japan Steel Works LTD.) in the condition that the process temperature was 300° C., the gas pressure was 2000 psi, and the volume ratio of nitrogen gas to carbon dioxide was 7:3.

Next, the tensile strength maintenance, the bending strength maintenance, and the Izod impact strength maintenance of Foam (11)-(13) were measured, and the results are shown in Table 5. Furthermore, the average pore diameter of foam cells, and distribution density of foam cells of Foam (11)-(13) were determined according to ASTM-D-3576-77, and the results are shown in Table 5.

Figure 9:
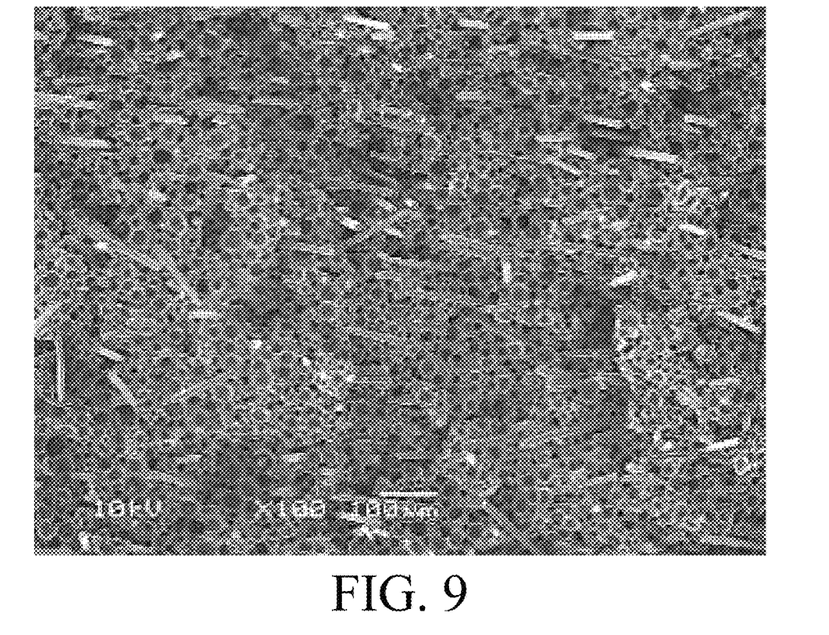
Figure 10:
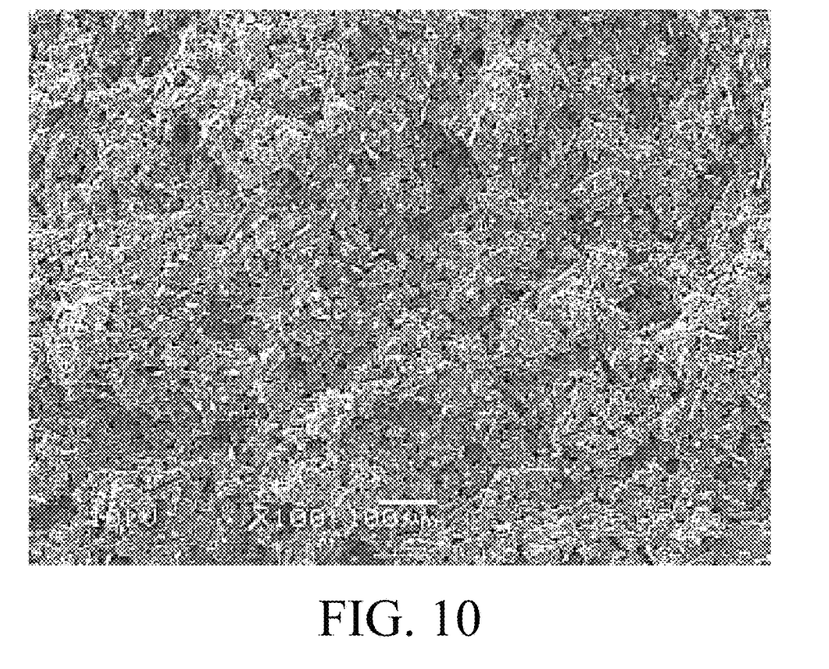

FIGS. 9 and 10 are scanning electron microscope (SEM) photographs of Foams (11) and (12) respectively.

TABLE 5

| | polyphenylene sulfide (parts by weight) | polytetrafluoroethylene (PTFE) (parts by weight) | oligomer (1) (parts by weight) | oligomer (2) (parts by weight) | reinforcement fiber (parts by weight) | average pore diameter of foam cells (μm) | distribution density of foam cells (cells/cm³) | tensile strength maintenance (%) | bending strength maintenance (%) | Izod impact strength maintenance (%) |
|---|---|---|---|---|---|---|---|---|---|---|
| Foam (11) (Example 3) | 66 | 2 | 0.5 | 1.5 | 30 (glass fiber) | 37.2 | $9.1 \times 10^6$ | 74.2 | 90.3 | 91.7 |
| Foam (12) (Example 4) | 56 | 2 | 0.5 | 1.5 | 40 (carbon fiber) | 29.5 | $3.1 \times 10^7$ | 80.9 | 81.5 | 88.1 |
| Foam (13) (Comparative Example 8) | 70 | — | — | — | 30 (glass fiber) | 87 | $6.0 \times 10^4$ | 68.1 | 87.7 | 79.5 |

The foam prepared from the composite material of the disclosure prepared in a specific ratio of polyphenylene sulfide, Oligomer (1), Oligomer (2), reinforcement fiber, and polytetrafluoroethylene (PTFE) (i.e. Composite material masterbatches (7) and (8) of Examples 3 and 4) exhibits relatively improved tensile strength maintenance, bending strength maintenance, and Izod impact strength maintenance, low average pore diameter of foam cells and high distribution density of foam cells (greater than $5 \times 10^6$ cells/cm³). In addition, the pore diameter of foam cells of Foam (11) and (12) is uniform (for example the maximum pore diameter of foam cells is less than 50 μm), as shown in FIG. 9 and FIG. 10. As shown in Table 5, Foam (13) prepared from polyphenylene sulfide and glass fiber exhibits high average pore diameter of foam cells and low distribution density of foam cells.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A foam, consisting of a composite material and a plurality of foam cells, and a plurality of foam cells is disposed in the composite material, wherein the composite material comprises a modified sulfur-containing polymer, and a fluorine-containing polymer fiber, wherein a degree of orientation as defined by the ratio $I_{110}/I_{200}$ is from 1.0 to 1.3, wherein $I_{110}$ is an X-ray diffraction peak intensity of (110) planes of the modified sulfur-containing polymer and $I_{200}$ is an X-ray diffraction peak intensity of (200) planes of the modified sulfur-containing polymer.

2. The foam as claimed in claim 1, wherein the foam has an average pore diameter of foam cells of 10 μm to 50 μm.

3. The foam as claimed in claim 1, wherein the foam has a distribution density of foam cells of $5 \times 10^6$ to $1 \times 10^8$ cells/cm³.

4. A composite material, comprising:
a fluorine-containing polymer fiber; and
a modified sulfur-containing polymer, wherein a degree of orientation as defined by the ratio $I_{110}/I_{200}$ is from 1.0 to 1.3, wherein $I_{110}$ is an X-ray diffraction peak intensity of (110) planes of the modified sulfur-containing polymer and $I_{200}$ is an X-ray diffraction peak intensity of (200) planes of the modified sulfur-containing polymer, and wherein the fluorine-containing polymer fiber is 0.1 wt % to 2 wt %, based on the total weight of the fluorine-containing polymer fiber and the modified sulfur-containing polymer.

5. The composite material as claimed in claim 4, wherein the modified sulfur-containing polymer is a reaction product of a sulfur-containing polymer, a vinyl aromatic-co-acrylate oligomer with an epoxy functional group, and a vinyl aromatic-co-maleic anhydride oligomer.

6. The composite material as claimed in claim 4, wherein the fluorine-containing polymer fiber is polytetrafluoroethylene (PTFE) fiber, polyvinylidene fluoride (PVDF) fiber, perfluoroalkoxy alkane (PFA) fiber, fluorinated ethylene propylene (FEP) fiber, or a combination thereof.

7. The composite material as claimed in claim 4, wherein the fluorine-containing polymer fiber has an average length-to-diameter ratio (L/D ratio) of 5 to 2,000.

8. The composite material as claimed in claim 4, wherein a melt flow index of the composite material is less than 100 g/10 minutes.

9. The composite material as claimed in claim 4, wherein the composite material further comprises a reinforcement fiber, wherein a ratio of a weight of the reinforcement fiber to a total weight of the modified sulfur-containing polymer and the fluorine-containing polymer fiber is 0.5:9.5 to 4:6.

10. A foaming composition, used to prepare the foam as claimed in claim 1, comprising:
96-98.9 parts by weight of a sulfur-containing polymer;
0.5 to 2 parts by weight of a vinyl aromatic-co-acrylate oligomer with an epoxy functional group;
0.5 to 2 parts by weight of a vinyl aromatic-co-maleic anhydride oligomer; and
0.1 to 2 parts by weight of a fluorine-containing polymer, wherein a total weight of the sulfur-containing polymer, the vinyl aromatic-co-acrylate oligomer with an epoxy functional group, the vinyl aromatic-co-maleic anhydride oligomer, and the fluorine-containing polymer is parts by weight.

11. The foaming composition as claimed in claim 10, further comprising:
5 to 70 parts by weight of a reinforcement fiber.

12. The foaming composition as claimed in claim 10, wherein the sulfur-containing polymer is polyarylene sulfide, polyarylsulfone, poly(ether sulfones), or poly(phenylene sulfide sulfone).

13. The foaming composition as claimed in claim 10, wherein a number average molecular weight of the vinyl aromatic-co-acrylate oligomer with the epoxy functional group is 1,500 g/mol to 65,000 g/mol, an acid value of the vinyl aromatic-co-acrylate oligomer with the epoxy functional group is 65 mgKOH/g to 500 mgKOH/g, and an epoxy equivalent per weight (EEW) of the vinyl aromatic-co-acrylate oligomer with the epoxy functional group is 200 g/mole to 2,000 g/mole.

14. The foaming composition as claimed in claim 10, wherein the vinyl aromatic-co-acrylate oligomer with an epoxy functional group is a copolymer of a first vinyl aromatic monomer and an acrylate monomer, wherein the acrylate monomer comprises an acrylate monomer with an epoxy functional group.

15. The foaming composition as claimed in claim 14, wherein the first vinyl aromatic monomer is styrene, methyl styrene, ethyl styrene, propyl styrene, cyclohexyl styrene, vinyl biphenyl, or a combination thereof, and the acrylate monomer with the epoxy functional group is glycidyl acrylate, glycidyl methacrylate, 2-(2-oxiranylmethoxy)ethyl methacrylate, 2-(2-oxiranylmethoxy)ethyl acrylate, 3,4-epoxycyclohexylmethyl acrylate, 3,4-epoxycyclohexylmethyl methacrylate, 2-methylglycidyl acrylate, 2-methyl glycidyl methacrylate, or a combination thereof.

16. The foaming composition as claimed in claim 14, wherein the acrylate monomer further comprises methyl acrylate, methyl methacrylate, ethyl acrylate, ethyl methacrylate, n-butyl acrylate, n-butyl methacrylate, sec-butyl acrylate, sec-butyl methacrylate, tert-butyl acrylate, tert-butyl methacrylate, cyclohexyl acrylate, cyclohexyl methacrylate, or a combination thereof.

17. The foaming composition as claimed in claim 10, wherein a number average molecular weight of the vinyl aromatic-co-maleic anhydride oligomer is 2,000 g/mol to 15,000 g/mol, and an acid value of the vinyl aromatic-co-maleic anhydride oligomer is 200 mgKOH/g to 500 mgKOH/g.

18. The foaming composition as claimed in claim 10, wherein the vinyl aromatic-co-maleic anhydride oligomer is a copolymer of a second vinyl aromatic monomer and a maleic anhydride monomer.

19. The foaming composition as claimed in claim 18, wherein a molar ratio of the second vinyl aromatic monomer to the maleic anhydride monomer is 1:1 to 4:1.

20. The foaming composition as claimed in claim 18, wherein the second vinyl aromatic monomer is styrene, methylstyrene, ethylstyrene, propylstyrene, cyclohexyl styrene, vinyl biphenyl, or a combination thereof, and the maleic anhydride monomer is maleic anhydride, 2-methyl-maleic anhydride, 2,3-dimethyl-maleic anhydride, 2-ethyl-maleic anhydride, 2,3-diethyl-maleic anhydride, 2-trifluoromethyl-maleic anhydride, 2,3-bis(trifluoromethyl)-maleic anhydride, 2-methyl-3-trifluoromethyl-maleic anhydride, or a combination thereof.

21. The foaming composition as claimed in claim 10, wherein the sulfur-containing polymer, the vinyl aromatic-co-acrylate oligomer with an epoxy functional group, and the vinyl aromatic-co-maleic anhydride oligomer are free of nitrogen atom.

22. The foaming composition as claimed in claim 10, wherein a ratio of the total weight of the vinyl aromatic-co-acrylate oligomer with an epoxy functional group and the vinyl aromatic-co-maleic anhydride oligomer to the weight of the sulfur-containing polymer is 5:1000 to 3.1:100, and a weight ratio of the vinyl aromatic-co-acrylate oligomer with an epoxy functional group to the vinyl aromatic-co-maleic anhydride oligomer is 1:5 to 5:1.

23. The foaming composition as claimed in claim 10, wherein the fluorine-containing polymer is polytetrafluoroethylene (PTFE), polyvinylidene fluoride (PVDF), perfluoroalkoxy alkane (PFA), fluorinated ethylene propylene (FEP), or a combination thereof.

24. The foaming composition as claimed in claim 10, wherein the reinforcement fiber is glass fiber, carbon fiber, or a combination thereof.

* * * * *